United States Patent
Lambert

(10) Patent No.: US 10,071,356 B2
(45) Date of Patent: Sep. 11, 2018

(54) MOVING BED CATALYTIC REACTOR FOR MANAGING INTERRUPTIONS TO THE CIRCULATION OF CATALYST, AND PROCESS USING SAID REACTOR

(71) Applicant: AXENS, Rueil Malmaison (FR)

(72) Inventor: Fabian Lambert, Chatou (FR)

(73) Assignee: AXENS, Rueil Malmaison (FR)

( * ) Notice: Subject to any disclaimer, the term of this patent is extended or adjusted under 35 U.S.C. 154(b) by 109 days.

(21) Appl. No.: 15/122,000

(22) PCT Filed: Feb. 11, 2015

(86) PCT No.: PCT/EP2015/052863
§ 371 (c)(1),
(2) Date: Aug. 26, 2016

(87) PCT Pub. No.: WO2015/128191
PCT Pub. Date: Sep. 3, 2015

(65) Prior Publication Data
US 2017/0014791 A1    Jan. 19, 2017

(30) Foreign Application Priority Data
Feb. 27, 2014 (FR) ..................... 14 51613

(51) Int. Cl.
*B01J 8/12* (2006.01)
(52) U.S. Cl.
CPC ........ *B01J 8/12* (2013.01); *B01J 2208/00761* (2013.01); *B01J 2208/00769* (2013.01); *B01J 2208/00814* (2013.01); *B01J 2208/00884* (2013.01); *B01J 2208/027* (2013.01); *B01J 2219/00036* (2013.01)

(58) Field of Classification Search
CPC ......................................... B01J 8/12
See application file for complete search history.

(56) References Cited

U.S. PATENT DOCUMENTS

| 4,040,794 A | 8/1977 | Stone | |
| 2004/0018124 A1* | 1/2004 | Filippi | B01J 8/0035 422/181 |
| 2010/0276336 A1 | 11/2010 | Ferschneider et al. | |

FOREIGN PATENT DOCUMENTS

| EP | 0577118 A1 | 1/1994 |
| FR | 2924625 A1 | 6/2009 |
| FR | 2966751 A1 | 5/2012 |

OTHER PUBLICATIONS

International Search Report dated Apr. 21, 2015 issued in corresponding PCT/EP2015/052863 application (3 pages).
English Abstract of EP 0577118 A1 published Jan. 5, 1994.
English Abstract of FR 2966751 A1 published May 4, 2012.

* cited by examiner

*Primary Examiner* — Brian A McCaig
(74) *Attorney, Agent, or Firm* — Millen, White, Zelano & Branigan P.C.

(57) ABSTRACT

The present invention describes a catalytic reactor operating as a moving bed to manage interruptions in the circulation of catalyst while at the same time avoiding mechanical damage to the contact means containing the catalyst. The invention also concerns a refining or petrochemicals process using the reactor in accordance with the invention.

9 Claims, 2 Drawing Sheets

MOVING BED CATALYTIC REACTOR FOR MANAGING INTERRUPTIONS TO THE CIRCULATION OF CATALYST, AND PROCESS USING SAID REACTOR

CONTEXT OF THE INVENTION

The present invention relates to the field of moving bed reactors used in certain refining and petrochemicals processes such as, for example, the catalytic reforming of gasolines, or BTX production (Benzene Toluene and Xylenes), which are usually operated with a continuous regeneration of the catalyst.

Catalytic processes operated with a moving bed of catalyst allow the catalyst to be continuously regenerated. However, for reasons of maintenance of the unit or because of possible malfunctions, the situation may arise whereby circulation of the catalyst is slowed down or even temporarily halted.

When the circulation of the catalyst is not continuous but is periodic, the situation may arise whereby the periodicity is not suitable or is disrupted during operation, thus causing a prolonged stoppage in the circulation of the catalyst.

When the stoppage in the circulation of catalyst is concomitant with cooling of the contact means of the reactor, this results in a modification to the geometry of these contact means, leading to a reduction in the volume available to the catalyst, which is barely compressible because it is a solid, which could cause a local increase in stresses over certain internal parts.

Thus, for example, in catalytic reforming reactors, stopping the circulation of the catalyst may in some cases cause a reduction in the diameter and height of the screens forming the basket containing the catalyst, thereby generating a supplemental pressure on the screens of the basket.

Throughout the remainder of the text, the term "basket" will be used to mean the envelope which is generally, but not necessarily, annular in shape, which contains the catalyst and which has side walls which allow the reagents and the reaction effluents to pass through.

Compressibility of the catalyst is very low, this results in a definitive deterioration of the screens, or even in the mountings for the screens at the bottom of the reactor being torn out, thus the catalyst can pass into internal portions of said reactor which are not intended to contain catalyst.

This type of deterioration results in disruption of a greater or lesser severity to the proper operation of the process.

The consequences may be a loss of performance, which may even extend to non-operability of the unit, and thus the need for action to be taken as regards the equipment, leading to stoppages of varying lengths of time.

The present invention can be used to eliminate the risks associated with stoppage of the circulation of catalyst described above.

PRIOR ART

The prior art in the field of reactors with a moving bed type flow, in particular the catalytic reforming of gasolines, is vast.

We shall limit ourselves here to documents which describe typical configurations of moving bed reactors.

The U.S. Pat. No. 3,864,240, U.S. Pat. No. 4,040,794, FR 2 160 269 and FR 2 946 660 describe various types of moving bed reactors which may in particular be used in a process for the catalytic reforming of gasolines. In this type of process, the catalyst circulates between the various reactors of the reaction section, usually 4 reactors, then to the regenerator.

The regenerated catalyst is then returned to the reaction section.

In accordance with other variations such as those described in document U.S. Pat. No. 3,706,536, the various catalytic zones are stacked ("stacked reactor") to form just one single reactor comprising the various reaction sections between which the catalyst circulates.

It is also possible to associate a reactor comprising a plurality of stacked reaction sections with one or more reactors comprising one or more reaction sections (described in FIG. 1 of FR 2 160 269).

By optionally employing certain adaptations which are readily available to the person skilled in the art, the present invention concerns both embodiments comprising separate reactors and those employing stacked reaction zones.

The catalyst occupies all of the space included between the outer wall of the basket and the centre pipe (3). In normal operation, the catalyst flows via the diplegs (2).

Figure 1A:
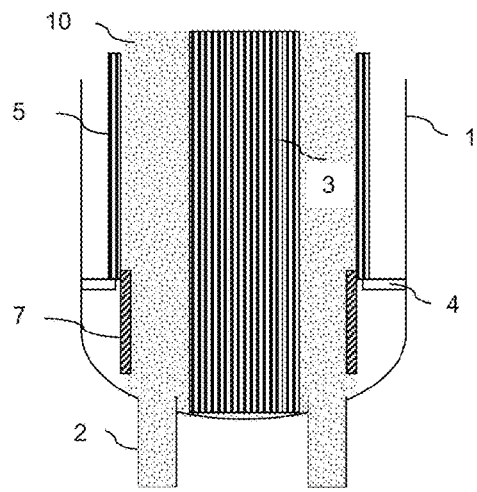
FIG. 1a represents a view of the lower portion of the reactor (1) which highlights the centre pipe (3), the outer wall of the basket (5), the substantially vertical flaps (7) extending the outer wall of the basket which are fixed thereto, and the supports (4) on which the basket rests.
Figure 1B:
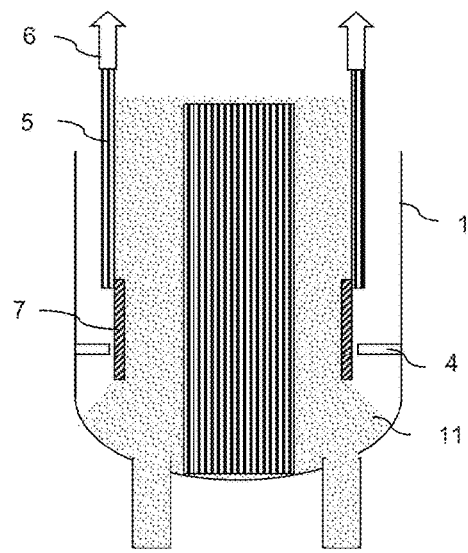

FIG. 1b represents the same view of the lower portion of the reactor (1), but in the case of an interruption to the circulation of catalyst. The assembly of the basket (5) and the attached flaps (7) have been lifted upwards (in the direction of the arrow).

The catalyst occupies the portion known as the storage zone which is opened up by lifting the basket (5).

FIG. 1c again represents the lower portion of the reactor (1) when circulation of the catalyst has been re-established. The basket (5) and the attached flaps (7) descend again into their normal position, and the catalyst stored in the storage zone resumes its circulation towards the circulating diplegs (2).

Figure 2A:
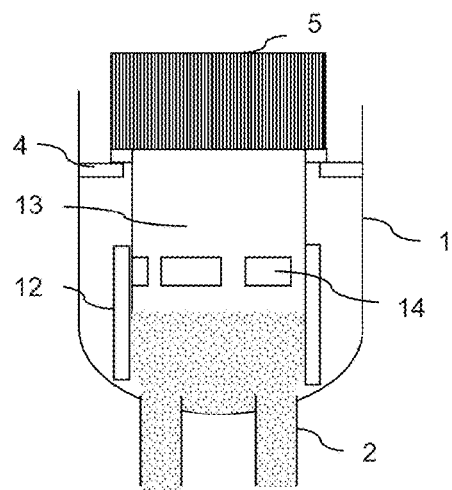

FIG. 2a represents a view of the lower portion of the reactor (1) in the variation of the present invention in which the lower portion of the basket (5) is equipped with a flap (13) comprising windows (14). The flap (13) of the basket (5) can slide in a sleeve (12).

Figure 2B:
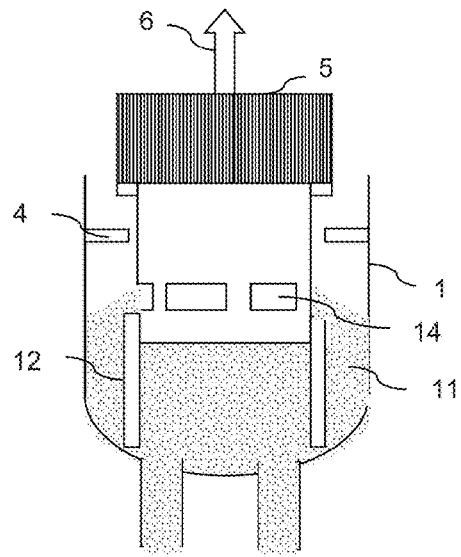
Figure 2C:
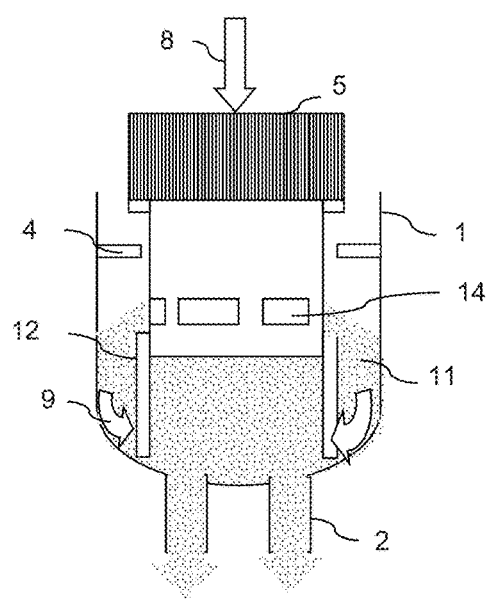

FIGS. 2a, 2b and 2c are views which confronts the flaps (5). Thus, the centre pipe (3) is no longer visible, although it is present.

In FIG. 2a, the removable basket (5) is in the lower position and rests on the supports (4).

In this configuration, the windows (14) of the flap (13) in the lower portion of the basket are masked by the sleeve (12). Thus, the catalyst is maintained in the basket (5).

FIG. 2b represents the same view of the lower portion of the reactor (1), but when circulation of the catalyst has been interrupted. The assembly of the basket (5) and the attached flaps (13) have been lifted upwards (direction of the arrow 6).

The catalyst occupies the portion known as the storage zone (11) which has been opened up by lifting the basket (5) by flowing through the windows (14). As it lifts, the flap (13) is guided by the sleeves (12).

FIG. 2c again represents the lower portion of the reactor (1), when the circulation of catalyst has been re-established. The basket (5) and the attached flaps (13) descend once again into their normal position (see arrow 8) and the catalyst stored in the storage zone (11) resumes its circulation towards the circulating diplegs (2), passing through the space left open between the sleeves (12) and the bottom of the reactor (arrow 9).

BRIEF DESCRIPTION OF THE INVENTION

The invention essentially consists in modifying moving bed reactors by incorporating movable baskets into these reactors which, when they are lifted by a particular stress, allow the catalyst to be transferred into a buffer storage zone. The term "moving bed reactor" means any type of reactor in which the catalyst flows from the reaction zone to a regeneration zone in a continuous or temporary manner. In this definition, the manner in which the feed moves within the circulating catalytic bed is not specified.

In units of the catalytic reforming type for gasoline, the flow of feed is generally perpendicular to the flow of the catalyst and occurs from the periphery towards a centre pipe. A flow of feed in the reverse direction is also possible. The catalyst is contained in baskets constituted by screens the side walls of which can admit the feed and transfer it towards the centre pipe.

The baskets have a fixed point located in the upper portion which is generally conical in shape. When circulation of the catalyst is interrupted, the catalyst piles up in said upper portion.

The cooling which is generally concomitant with interruption of the circulation of the catalyst induces contraction of the assembly of baskets which thus have a tendency to rise up. In accordance with the present invention, the configuration of the bottom of the reactor can thus be used to open up a space known as the storage zone, which means that the catalyst can occupy said space.

Subsequently, the catalyst stored in the storage zone is reintroduced into the normal circulation of the catalyst.

More precisely, the present invention can be defined as a catalytic reactor employing a moving bed catalyst, in which the catalyst is enclosed in baskets (5) which are annular in shape wherein the walls are constituted by screens which allow the feed to pass from the exterior towards the interior of the basket, then the reaction effluents from the interior of the basket towards a centre pipe (3), or indeed in the opposite direction, said reactor being characterized in that the baskets (5) enclosing the catalyst are movable along a substantially vertical axis and are provided in the extension of their vertical wall with flaps (7) installed in the extension of the side wall of said baskets which, during an interruption to the circulation of the catalyst, opens up a storage space (11) for catalyst in the lower portion of the reactor, circulation of the catalyst under gravity being resumed as soon as the circulation is re-established.

In a preferred variation of the present invention, the moving bed catalytic refining reactor uses flaps (7) sliding in vertical sleeves (12) and are provided with windows (14) which are obstructed by the sleeves (12) during normal circulation, said windows (14) being opened up when the basket (5) is lifted following an interruption to the circulation, thus allowing the catalyst to pass through said windows (14) towards the storage zone (11) located in the lower portion of the reactor between the sleeve (12) and the wall of the catalyst.

In accordance with a more preferred variation of the present invention, the windows (14) are rectangular in shape so as to allow the catalyst to enter the storage zone (11) in a uniform manner.

In accordance with another preferred variation of the present invention, the windows (14) are triangular in shape, the point of the triangle being directed upwardly, so as to allow the catalyst to enter the storage zone (11) in a progressive manner.

The moving bed catalytic reactor of the present invention may be applied to any process which employs a moving bed of flowing catalyst in which the catalyst is contained in baskets within the meaning of the above definitions. An example of a moving bed process which may be cited includes the catalytic reforming of gasoline.

More generally, the moving bed catalytic reactor in accordance with the present invention may be applicable to any process which employs a circulation of catalyst in a moving bed such as, for example, certain residue hydrotreatment processes, or processes for the hydroconversion, hydrodesulphurization or hydrodemetallization of residues obtained, for example, from atmospheric distillation or from vacuum distillation of a crude oil.

DETAILED DESCRIPTION OF THE INVENTION

In a continuous moving bed type catalytic reforming reactor, the catalyst passes through several reactive zones in succession or several reactors before being sent to a regenerator.

Each reactor comprises at least one, or even several successive catalytic zones in which a bed of catalyst slowly descends, continuously or periodically, in the form of an uninterrupted column of grains of catalyst.

The feed moves in each catalytic zone in a flow which is substantially radial, generally from the periphery towards the centre and through the catalytic zones in a descending vertical movement. Circulation of the feed from the centre towards the periphery is also possible.

Thus, the feed passes through each catalytic zone in a direction which is substantially perpendicular to that of the flow of catalyst.

The catalyst is introduced into the top of the reactor into a space which is delimited by a wall having inlets/outlets.

The catalyst flows steadily from top to bottom of the catalytic zone under gravity and is withdrawn via the bottom using any appropriate means, for example a lift, in order to transport it from the lower portion of a given reactor to the upper portion of the catalytic zone of the next reactor, or towards the regenerator located after the last reactor of the series.

A series generally comprises 3 or 4 reactors operating in series.

The lift uses a working fluid, for example a gas, preferably hydrogen. An arrangement of this type is described in particular in the patent FR 2 160 269.

In this type of technology with the circulation of catalyst in a downwards flow, the catalyst is maintained in an annular zone delimited by screens, forming a basket which is substantially annular in shape.

Screens of this type have been described, for example in patents FR 2 961 215 and FR 2 966 751.

The screens are frequently of the "Johnson screen" type, which allow both good flow of the catalyst to the walls of said screens and the cross-current passage of the feed, then the passage of the reaction effluents towards the centre pipe.

Variations in the operating conditions in operation, for example heating up or cooling down to a greater or lesser extent, or even an emergency stoppage, may cause deformations (large differential expansions or contractions) in the contact means of the reactor.

These deformations may cause the forces on the screens to be increased.

Using the mobile baskets of the invention in moving bed reactors means that these disadvantages can be overcome by allowing the catalyst to have access to the internal volumes of the reactor which are available to store a portion of said catalyst, and thus to reduce or even completely eliminate the forces which are susceptible of being exerted on the screen in the event of cooling. Thus, deformation or tearing of the screen can be avoided.

The description below is intended to provide a better understanding of the invention with the aid of FIGS. 1a, 1b, 1c and 2a, 2b and 2c.

Figure 1C:
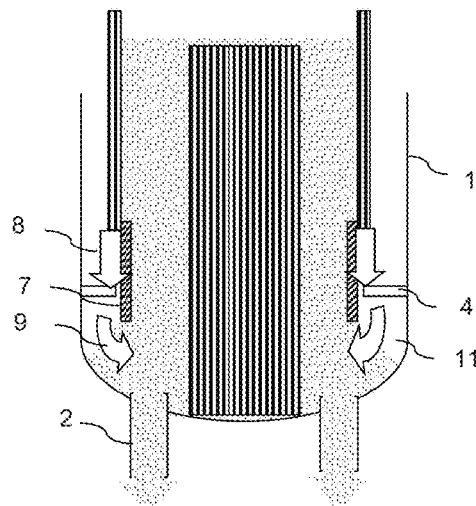

FIGS. 1a, 1b and 1c describe a first variation in which a mobile basket (5) containing the catalyst is equipped with a flap (7) which descends to the bottom of the reactor without resting on the lower portion of the reactor.

Preferably, said basket (5) is constructed with Johnson type screens which are constituted by an array of vertical wires with a regular spacing and held in place by horizontal wires welded to the vertical wires.

The basket rests on a support ring (4) welded to the shell.

In FIGS. 1a, 1b and 1c, the reactor (1) is equipped with diplegs (2) to allow the catalyst to descend and with a centre pipe (3) in order to collect the reaction effluents.

The mobile basket (5) holds the catalyst (10) between the wall and the centre pipe (3). This basket (5) is equipped in its lower portion with substantially vertical flaps (7) and guided by the annular support of the screen. The verticality can be assessed by the angle formed between the flaps (7) and the vertical, and is in the range 0° to 10°, preferably in the range 0° to 5°, and more preferably in the range 0° to 2°.

In FIG. 1a, the mobile basket (5) is in the lower position and rests on the horizontal supports (4). The catalyst is maintained between the centre pipe (3) and the wall of the basket (5) extended by the substantially vertical flaps (7).

During a stoppage to the circulation of catalyst concomitantly with cooling of the contact means, radial forces and an upwardly directed force are exerted on the screens of the basket (5). The upwardly directed force results principally from the fact that the catalyst is incompressible, while the basket, which has a relatively slim geometry, contracts over its length.

The top of the basket (5) has a tapered geometry, this zone being filled with catalyst. When circulation of the catalyst stops, the basket will rest on the bed of catalyst. By means of longitudinal contraction of the basket during cooling, since the upper portion of the basket (5) is bearing on the piled up catalyst, a substantially vertical translation of the base of the basket occurs, guided by sliding of the flaps (7) with respect to the support ring (4), as seen in FIG. 1b.

The space between the flaps (7) and the bottom of the reactor enlarges, opening up a storage zone (11) which can accommodate a portion of the catalyst and thus reduce or even eliminate the force exerted on the screens of the basket (5).

When the circulation resumes in the diplegs (2), the catalyst is sent to a lifting chamber (not shown) for the catalyst which can be used to send it to the next reactor or to the regenerator.

The storage zone (11) is thus steadily emptied in a natural manner, i.e. under gravity (see arrow 9 in FIG. 1c), and the basket descends again slowly (see arrow 8 in FIG. 1c) towards its lower position corresponding to FIG. 1a.

A cycle of this type can be repeated until another stoppage or incident in the circulation of the catalyst occurs.

FIGS. 2a, 2b and 2c describe a second variation of the equipment in accordance with the invention.

In this series of figures, for better comprehension of the invention, the centre pipe (3) of FIG. 1 has not been shown.

FIGS. 2a, 2b, 2c correspond to a view which confronts the flaps (13).

In accordance with this variation, the lower portion of the basket (5) is equipped with a flap (13) comprising windows (14). The flap (13) of the basket can slide in a sleeve (12).

The sleeve (12) is perforated at its base (not shown in the figure) in order to allow catalyst accumulated in the storage zone (11) to flow towards the circulating diplegs (2) when circulation of the catalyst is resuming.

In FIG. 2a, the removable basket (5) rests on the supports (4) and thus is in the lower position.

In this configuration, the windows (14) of the flap (13) in the low portion of the basket are masked by the sleeve (12). Thus, the catalyst is maintained in the basket.

FIG. 2b shows the situation of an interruption to the circulation of catalyst. When a force is exerted following stoppage to the circulation of catalyst, the removable basket (5) is free to rise in the direction of the arrow 6 and the windows (14) are slowly revealed, enabling the catalyst to access the storage zone (11).

The catalyst in fact passes through the windows (14) and enters the lower portion of the reactor (11) on the other side of the sleeves (12).

FIG. 2c corresponds to the resumption of circulation of the catalyst. When circulation of the catalyst resumes, the catalyst flows from the storage zone (11) towards the circulating diplegs (2) via openings located in the base of the sleeve (12), not shown in FIG. 2c, and via the space which is left open between the lower end of the sleeves (12) and the bottom of the reactor.

The catalyst steadily empties out of the storage zone (11) and the basket (5) descends again slowly (in the direction of the arrow 8 in FIG. 2c) until it again rests on the supports (4). The windows (14) are then again obstructed by the sleeve (12).

Various geometries for the windows (14) may be used in order to obtain slower or faster transfers of catalyst towards the storage zone (11).

As an example:
rectangular windows may be used to release an identical quantity of catalyst per unit upwards translation of the basket;
triangular upwardly-pointing windows or trapezoidal windows with the short side upwards may be used to release a larger quantity of catalyst gradually as the basket is lifted;
downwardly-pointing triangular windows or trapezoidal windows with the short side towards the bottom may be used to release a larger quantity of catalyst as soon as the basket is lifted;
windows over several rows with identical or different geometries may also be envisaged in order to release quantities of catalyst which are adjusted as a function of the height to which the basket has been lifted.

In summary, the invention concerns a catalytic reactor employing a moving bed catalyst, in which the catalyst is enclosed in baskets (5) and in which said baskets are movable along a substantially vertical axis and provided with flaps (7, 13) which are themselves substantially vertical, installed in the lower portion of said baskets, and in which, during an interruption to the circulation of catalyst, a storage space (11) for catalyst located in the lower portion of the reactor is opened up.

The invention also concerns a refining or petrochemicals process using the reactor in accordance with the invention. Preferably, said process is a process for the catalytic reforming of gasolines; in accordance with another variation, said process is a residue hydrotreatment process.

Thus, the invention also concerns a catalytic refining process employing a moving bed catalyst, in which the catalyst is enclosed in baskets (5) and in which said baskets are movable along a substantially vertical axis and provided with flaps (7, 13) which are themselves substantially vertical, installed in the lower portion of said baskets, and in which, during an interruption to the circulation of catalyst, a storage space (11) for catalyst located in the lower portion of the reactor is opened up.

In the reactor or the process in accordance with the invention, the following variations or preferences may be implemented:

Preferably, circulation under gravity of said catalyst is resumed as soon as circulation is re-established.

More preferably, said catalyst may be enclosed in baskets (5) which are annular in shape, with the walls being constituted by screens which allow the feed to pass from the exterior towards the interior of the basket, then the reaction effluents to pass from the interior of the basket towards a centre pipe.

In accordance with a preferred variation, the catalytic reactor or the process employing a moving bed of catalyst in accordance with the invention may comprise flaps (7, 13) which slide in vertical sleeves (12) and which are provided with windows (14) which are obstructed by the sleeves (12) during normal circulation, said windows (14) being opened up when the basket (5) is lifted following an interruption to the circulation, thus allowing the catalyst to pass through said windows (14) towards the storage space (11) located in the lower portion of the reactor between the sleeve (12) and the wall of the catalyst.

Preferably, said windows (14) are rectangular in shape so as to allow the catalyst to enter the storage zone (11) in a uniform manner.

In accordance with another variation, said windows (14) are triangular in shape, with the point of the triangle being directed upwardly, so as to allow the catalyst to enter the storage zone (11) in a progressive manner.

Advantage of the Invention Over the Prior Art

The prior art solutions which can be used to prevent forces from accumulating on the screens when the circulation of catalyst is stopped and concomitant cooling occurs involve a catalyst transfer device known as an additional lift, such as that described in patent FR 2 160 269.

This additional lift generally operates with a gas the availability of which is guaranteed at all times, typically nitrogen.

Employing an additional lift, however, necessitates an action by the operator which is aimed at bringing emergency equipment on-line, assuming that the operating conditions for ensuring transfer of catalyst are rapidly obtained. The operator also has to take care to preserve the integrity of the other equipment which could have been affected by the incident.

The solution proposed in the present invention does not involve any supplemental equipment and uses a zone of the reactor, i.e. the lower portion of said reactor, in which the catalyst moves in a non-ideal manner, according to the prior art.

In fact, the catalyst normally circulating in this zone is hardly used or not used at all, as it is generally poorly flushed by the process gas.

By opening up said zone and using it as a temporary storage zone for the catalyst, the present invention proposes an interesting solution without major modifications to the conventional reactor design.

It also provides the additional advantage of not necessitating intervention by an operator, since the natural behaviour of the equipment in the event of an external incident is used to counter the potentially negative effects of said external incident.

The reliability and reactivity of the solution in accordance with the present invention thus does not depend on the time taken or the validity of the intervention by the operator, and is not subject to any external risk of error such as, for example, drift of a measuring instrument.

The invention claimed is:

1. A catalytic reactor employing a moving bed catalyst, in which the catalyst is enclosed in baskets (5) and in which said baskets are movable along a substantially vertical axis and provided with flaps (7, 13) which are themselves substantially vertical, installed in the bottom portion of said baskets (5), and in which, during an interruption to the circulation of catalyst, a storage zone (11) for catalyst located in the lower portion of the reactor is opened up by lifting the assembly of the basket (5) and the flaps upwards.

2. The moving bed catalytic reactor according to claim 1, in which the catalyst is enclosed in baskets (5) which are annular in shape, wherein the walls are constituted by screens which allow the feed to pass from the exterior towards the interior of the basket (5), then the reaction effluents to pass from the interior of the basket (5) towards a centre pipe (3).

3. The moving bed catalytic reactor according to claim 1, in which the flaps (7, 13) slide in vertical sleeves (12) and are provided with windows (14) which are obstructed by the sleeves (12) during normal circulation, said windows (14) being opened up when the basket (5) is lifted following an interruption to the circulation, thus allowing the catalyst to pass through said windows (14) towards the storage zone (11) located in the lower portion of the reactor between the sleeve (12) and the wall of the catalyst.

4. The moving bed catalytic reactor according to claim 3, in which the windows (14) are rectangular in shape so as to allow the catalyst to enter the storage zone (11) in a uniform manner.

5. The moving bed catalytic reactor according to claim 3, in which the windows (14) are triangular in shape, with the point of the triangle being directed upwardly, so as to allow the catalyst to enter the storage zone (11) in a progressive manner.

6. A process comprising:
   conducting a refining or petrochemical process using the reactor according to claim 1.

7. The process of claim 6, wherein circulation of the catalyst under gravity is resumed as soon as the circulation is re-established.

8. A process comprising:
   catalytic reforming of gasoline using the reactor according to claim 1.

9. A process comprising:
 conducting a residue hydrotreatment process using the reactor according to claim 1.

* * * * *